United States Patent
Mayer et al.

(10) Patent No.: US 7,490,511 B2
(45) Date of Patent: Feb. 17, 2009

(54) FLOW SENSOR WITH FLOW-ADAPTABLE ANALOG-DIGITAL-CONVERTER

(75) Inventors: Felix Mayer, Stäfa (CH); Moritz Lechner, Stäfa (CH); Mark Hornung, Männedorf (CH); Marc von Waldkirch, Zollikon (CH)

(73) Assignee: Sensirion AG, Stafa (CH)

( * ) Notice: Subject to any disclaimer, the term of this patent is extended or adjusted under 35 U.S.C. 154(b) by 27 days.

(21) Appl. No.: 11/710,193

(22) Filed: Feb. 22, 2007

(65) Prior Publication Data

US 2007/0227242 A1 Oct. 4, 2007

(30) Foreign Application Priority Data

Mar. 31, 2006 (EP) .................................. 06006932

(51) Int. Cl.
G01F 1/68 (2006.01)
(52) U.S. Cl. .................................................. 73/204.15
(58) Field of Classification Search ............. 73/204.15, 73/204.16, 204.26, 861.11
See application file for complete search history.

(56) References Cited

U.S. PATENT DOCUMENTS

| | | | |
|---|---|---|---|
| 4,672,997 | A | 6/1987 | Landis et al. |
| 4,784,721 | A | 11/1988 | Holman et al. |
| 4,884,443 | A | 12/1989 | Lee et al. |
| 5,321,983 | A | 6/1994 | Nagata |
| 5,804,720 | A | 9/1998 | Morimasa et al. |
| 6,349,596 | B1 | 2/2002 | Nakada et al. |
| 6,370,950 | B1 | 4/2002 | Lammerink |
| 6,550,324 | B1 | 4/2003 | Mayer et al. |
| 6,662,121 | B1 | 12/2003 | Oda et al. |
| 6,681,742 | B1 | 1/2004 | Hirayama et al. |
| 6,744,389 | B2 | 6/2004 | Haeberli et al. |
| 6,763,710 | B2 | 7/2004 | Mayer et al. |
| 6,813,944 | B2 | 11/2004 | Mayer et al. |
| 6,888,358 | B2 | 5/2005 | Lechner et al. |
| 6,889,545 | B2 | 5/2005 | Nakada et al. |
| 6,945,106 | B2 | 9/2005 | Lötters |
| 7,181,962 | B2 | 2/2007 | Yamada et al. |
| 7,188,519 | B2 | 3/2007 | Hornung et al. |
| 2003/0115952 | A1 | 6/2003 | Mayer et al. |
| 2003/0132866 | A1 | 7/2003 | Haeberli et al. |
| 2004/0000196 | A1 | 1/2004 | Kleinlogel et al. |
| 2007/0227242 | A1 | 10/2007 | Mayer et al. |
| 2007/0241093 | A1* | 10/2007 | von Waldkirch et al. ..... 219/385 |

FOREIGN PATENT DOCUMENTS

| | | |
|---|---|---|
| DE | 10129300 | 6/2000 |
| DE | 10129300 | 6/2001 |
| EP | 0204183 | 12/1986 |
| EP | 1065475 | 1/2001 |
| EP | 1873499 | 1/2008 |

* cited by examiner

*Primary Examiner*—Jewel Thompson
(74) *Attorney, Agent, or Firm*—Cooper & Dunham LLP

(57) ABSTRACT

The flow sensor comprises a heater arranged between two sensing thermopiles. In addition, at least one monitoring thermocouple is provided for measuring the temperature of the heater. The signal from the monitoring thermocouple is used as a reference voltage for an A/D converter, which converts the signals from the sensing thermopiles. This allows to increase the resolution of the converter at higher flows, which results in more accurate measurements.

15 Claims, 3 Drawing Sheets

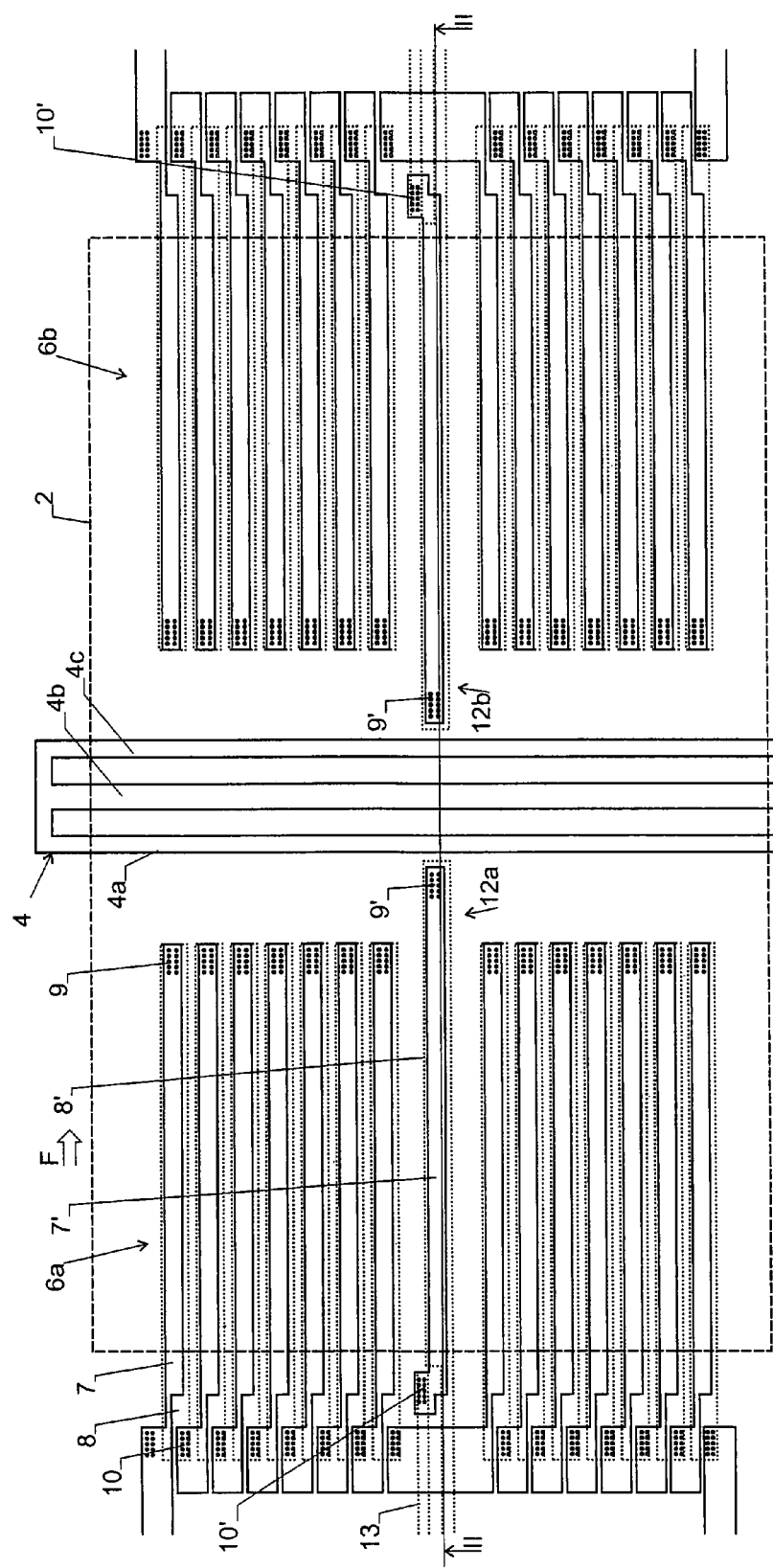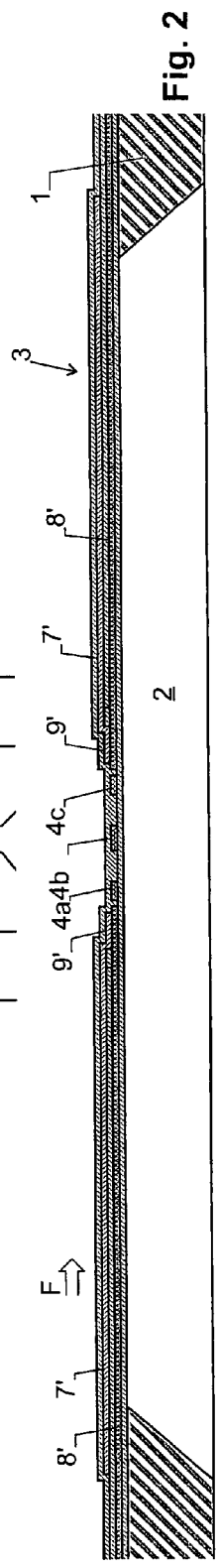

FLOW SENSOR WITH FLOW-ADAPTABLE ANALOG-DIGITAL-CONVERTER

CROSS REFERENCE TO RELATED APPLICATIONS

This application claims the priority of European patent application 06006932.5, filed Mar. 31, 2006, the disclosure of which is incorporated herein by reference in its entirety.

BACKGROUND OF THE INVENTION

The invention relates to a device for measuring the flow of a fluid that has a heater as well as first and second temperature sensors arranged on opposite sides of the heater. The device further comprises an analog-digital-converter for digitizing the signal from the temperature sensors. This type of flow sensor is e.g. described in US 2003/0115952. It comprises a reference voltage generator for feeding a reference voltage to the analog-digital-converter.

BRIEF SUMMARY OF THE INVENTION

It is an object of the present invention to provide means for improving the accuracy of such a device. This object is achieved by the flow sensor according to the independent claim.

Now, in order to implement these and still further objects of the invention, which will become more readily apparent as the description proceeds, the device comprises a heater, a first and a second temperature sensor arranged on opposite sides of said heater for generating a sensing signal depending on a temperature difference upstream and downstream from said heater, an analog-digital-converter for digitizing said sensing signal, wherein said analog/digital converter has a reference input and generates a digitized value of said sensing signal normalized by a signal at said reference input, a reference voltage generator connected to said reference input, wherein said reference voltage generator is adapted to decrease said reference voltage for increasing flows of said fluid.

Accordingly, the reference voltage generator, which generates the reference voltage for the analog-digital-converter, is adapted to decrease the reference voltage for an increasing flow velocity of the fluid. This is based on the understanding that the dependence of the measured analog sensing signal on the flow of the fluid is strongest for a weak flow and becomes increasingly weaker for stronger flow velocities. By decreasing the reference voltage for higher flow velocities, the resolution of the converter can be adapted to this behavior by being increased at such velocities.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 is a top view of a possible embodiment of the device,

FIG. 2 is a schematic sectional view along line II-II of FIG. 1,

DETAILED DESCRIPTION OF THE INVENTION

Figure 3:
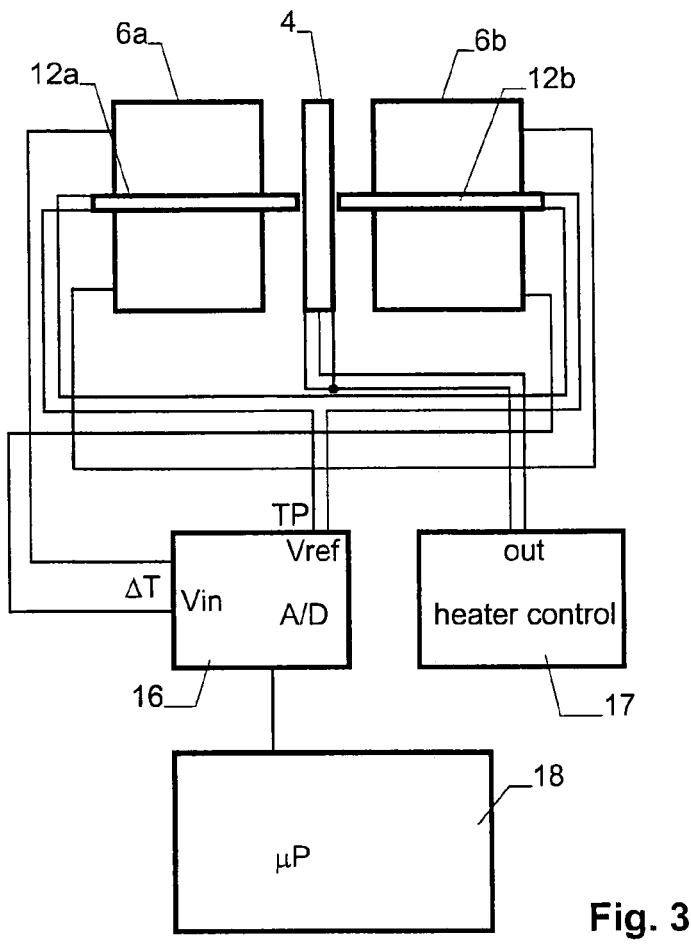
FIG. 3 is a block diagram of a first embodiment of the circuitry of the device.

The device of FIGS. 1 and 2 is designed as a semiconductor chip based on a silicon substrate 1, even though another semiconductor or dielectric substrate could be used as well. The device could also be built from discrete elements not mounted to a common substrate.

A recess or opening 2 has been formed in substrate 1 by etching techniques and is spanned by a membrane 3. A heater 4 extends over membrane 3. In the embodiment of FIGS. 1 and 2, heater 4 is formed by three parallel conductors 4a, 4b, 4c, the two outer conductors 4a, 4c being arranged, electrically, in parallel, while the center conductor 4b (having double cross section) is in series to the conductors 4a, 4c.

Two sensing thermopiles 6a and 6b, each consisting of a plurality of thermocouples in series, form first and second temperature sensors. They are arranged upstream and downstream of heater 4 (the terms "upstream" and "downstream" being defined in respect to a flow direction F perpendicular to the longitudinal axis of the heater). Each sensing thermocouple consists of a metal bar 7 (shown in continuous lines in FIG. 1) formed in a metal layer of the integrated circuit as well as a polysilicon bar 8 (shown in dotted liens in FIG. 1) formed in the polysilicon layer of the integrated circuit. The metal and polysilicon bars 7, 8 of each thermocouple are interconnected at a first junction 9 on membrane 3. The polysilicon and metal bars 8, 7 of two neighboring thermocouples are interconnected at a second junction 10, which second junction 10 is not located on membrane 3, but over the bulk of substrate 1.

The basic principle of operation of such a device is e.g. described in US 2003/0115952. A flow along flow direction F causes the distribution of heat from heater 4 to become asymmetric, which creates a difference of temperature at the first junctions 9 of the two thermopiles 6a, 6b. At the same time, the second junctions 10 remain at substantially constant temperatures due to the heat exchange through the thermally conducting substrate 1. Hence, the difference of the voltages from the thermopiles 6a, 6b (or any value proportional thereto), which is called the "sensing signal" in the following, is substantially a measure of the temperature difference ΔT at the first junctions 9 upstream and downstream of heater 4. This temperature difference ΔT is a measure of the mass flow of the fluid.

As can be seen in FIGS. 1 and 2, two additional monitoring thermocouples 12a, 12b are provided on the device, each of which is located at the center of one of the sensing thermopiles 6a, 6b. The monitoring thermocouples 12a, 12b together form a monitoring temperature sensor of the device.

Each monitoring thermocouple 12a, 12b again consists of a metal bar 7' and a polysilicon bar 8' interconnected at a first junction 9' located over membrane 3. The first junctions 9' of the monitoring thermocouples 12a, 12b are located much closer to heater 4 than the first junctions 9 of the sensing thermopiles 6a, 6b and have a temperature substantially corresponding to the temperature in heater 4. The second ends of the metal bars 7' are e.g. connected to a polysilicon lead 13 at a second junction 10'. The second junctions 10' are, in the embodiment of FIGS. 1 and 2, located over the bulk of substrate 1.

Each monitoring thermocouple 12a, 12b therefore generates a voltage substantially equal to the temperature difference between substrate 1 and heater 4. The voltages from the monitoring thermocouples 12a, 12b are added to generate a monitoring signal TP.

An embodiment of the circuitry of the device is shown in FIG. 3. It comprises an A/D-converter 16 for digitizing the sensing signal ΔT, a heater control 17 for controlling the current through heater 4 and a microcontroller 18 for processing the digitized sensing signal and controlling the device. Advantageously, the circuitry for all the elements 16, 17 and 18 is integrated on substrate 1, but it can also be formed at least in part by external components.

Basically, A/D-converter 16 can be any type, such as a successive-approximation ADC, a delta-encoded ADC or a sigma-delta converter. All such converter designs require a reference voltage Vref and generate a digitized value of the input signal normalized by Vref. The term "normalized", in this context, is to be understood such that the output value for a given input voltage depends linearly on the reciprocal value 1/Vref.

Advantageously, A/D-converter 16 is a sigma-delta converter, such as it is e.g. disclosed in DE 101 29 300. The description of the section "A/D-Wandler" and its associated figure of that document are incorporated herein by reference.

As can be seen in FIG. 3, the monitoring signal TP is fed to the reference input of A/D-converter 16 as a reference voltage Vref. The purpose of this measure is described below.

Heater control 17 of the embodiment of FIG. 3 regulates the power dissipated by heater 4 to a constant value. Alternatively, it regulates the current through heater 4 to a constant value.

Figure 4:
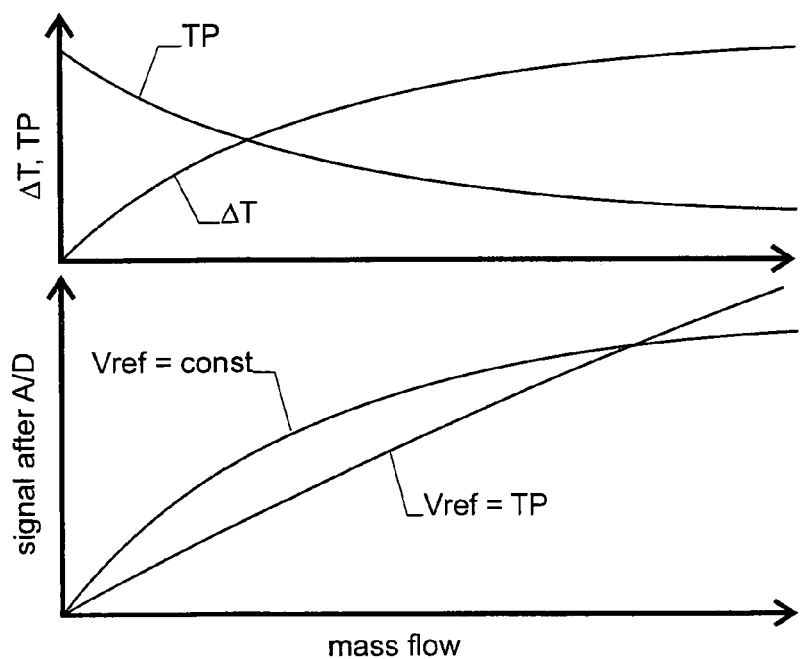
FIG. 4 illustrates the sensing signal ΔT, the monitoring signal TP, and the digitized value of the sensing signal as a function of mass flow with constant and non-constant Vref input.

The dependence of the temperature difference ΔT as a function of flow v is shown in the upper graph of FIG. 4. For zero flow, ΔT=0. With increasing flow, ΔT will start to rise linearly. At larger flows, however, the temperature of heater 4 (and therefore the monitoring signal TP) will decrease substantially because of the cooling effect that the passing fluid has on heater 4. Hence, for increasing flows v, the slope of the curve ΔT(v) will decrease as shown in the upper graph of FIG. 4.

If Vref of A/D-converter 16 were constant, the digitized value from A/D converter 16 would follow the curve "Vref=const" of the lower graph of FIG. 6. As will be understood by those skilled in the art, this will cause a decrease of measurement resolution for larger mass flows v because the resolution of the A/D-converter does not change over its range of input voltages.

However, as mentioned above, Vref is not constant, but rather it is set to the monitoring signal TP. Hence, the resolution of the A/D-converter will be coarser when the heater temperature is high, while the resolution will be finer when the heater temperature is low. This leads to a linearization of the digitized signal at the output of A/D-converter 16 as indicated by the curve "Vref=TP" in the bottom graph of FIG. 4.

Hence, using the monitoring signal TP as a reference voltage Vref allows to obtain a more constant digitization resolution over a wider range of mass flows, which in turn allows an increased accuracy of measurement and/or it allows to decrease the bit resolution of the A/D-converter.

At the same time, and as mentioned above, since the digitized value is proportional to the ratio ΔT:TP, variations of the Seeback coefficient or of other parameters of the used thermocouples tend to be compensated. Such variations can e.g. be observed when the overall temperature of the device changes, or when membrane 3 is subjected to stress.

In view of this, it will become apparent that the design of FIG. 1 has a further advantage: The monitoring thermocouples 12a, 12b are parallel and close to the corresponding thermocouples of the sensing thermopiles 6a, 6b, therefore a strain in membrane 2 will affect both the thermocouples 12a, 12b as well as the thermopiles 6a, 6b in similar manner and will therefore be eliminated in the output value of A/D-converter 16.

In the embodiment of FIG. 3, the sensing signal TP was used to generate the reference voltage Vref. In general, any voltage source generating a reference voltage proportional to a temperature signal indicative of a temperature of heater 4 can be used. Advantageously, the reference voltage should be proportional to the temperature difference between heater 4 and substrate 1—or, since the temperature of substrate 1 is primarily dominated by the temperature of the fluid, the reference voltage should be proportional to the temperature difference between heater 4 and the fluid.

Alternatively, a suitable reference voltage Vref can also be generated from the sensing signal ΔT itself. Namely, the reference voltage Vref has to decrease when the sensing signal ΔT increases. This can e.g. be achieved by using suitable analog circuitry for processing ΔT and for generating Vref therefrom, but an advantageous implementation uses digital processing as shown in the embodiment of FIG. 5.

Figure 5:
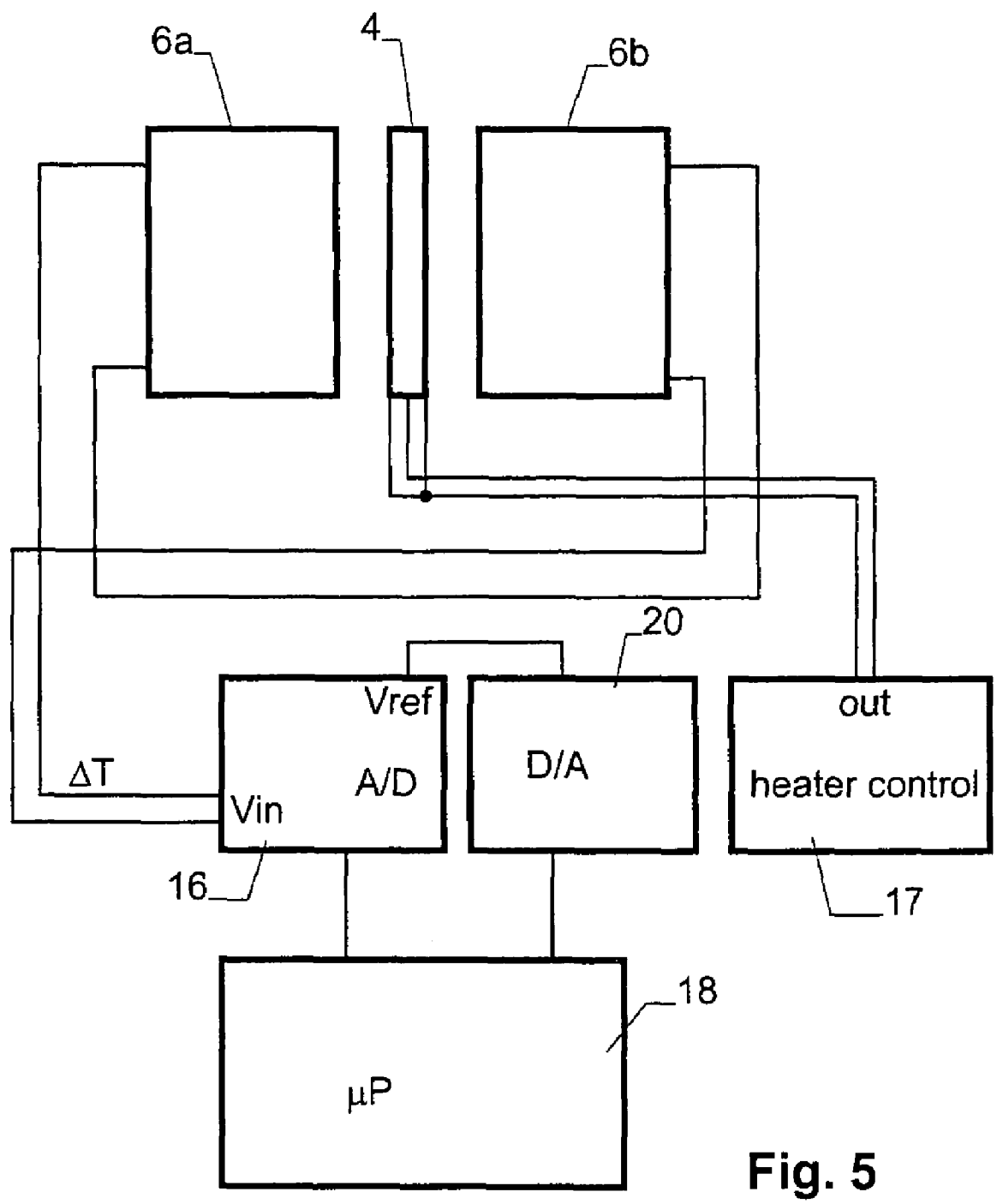
FIG. 5 is a block diagram of a second embodiment of the circuitry of the device.

In FIG. 5, the reference voltage Vref is generated by a digital-analog-converter 20 driven by microcontroller 18.

The device of FIG. 5 is adapted to first measure a raw digitized value while feeding a fixed, average reference voltage Vref to analog-digital-converter 16. The raw digitized value can then be used to choose a suitable reference voltage, e.g. using a calibration table in microcontroller 18. Then, a corrected digitized value is measured using the chosen reference voltage. The suitable reference voltage is chosen to decrease for increasing values of the raw digitized value in such a manner that the corrected digitized value is advantageously substantially proportional to the mass flow of the fluid.

The fixed reference voltage as well as the suitable reference voltage are both generated under control of microcontroller 18 by means of digital-analog-converter 20.

In the embodiments described so far, membrane 3 forms a "measuring region" in contrast to the remaining "regular region" of the chip surface supported by bulk substrate 1. The measuring region has much lower heat conductance between the components located thereon than the regular region. At least part of each, the heater 4, the sensing thermopiles 6a, 6b and the monitoring thermocouples, should be located on the measuring region. As it is known to the person skilled in the art, membrane 3 can be replaced by various other "membrane structures", where the term "membrane structure" describes any thin structure arranged over the opening or recess 2 in the semiconductor chip. The membrane structure can either be formed by a membrane completely closing the opening or recess in the chip, or by a bridge or tongue extending over or into the opening or recess.

Instead of using a recess or opening 2, the measuring region could also be located on top of a layer of material having low thermal conductivity, such as a nanoporous silicon oxide.

In the embodiment of FIG. 1, the monitoring thermocouples 12a, 12b are arranged upstream and downstream of heater 4. Alternatively, a suitable temperature sensor can e.g. be mounted in one or both of the gaps between the conductors 4a, 4b, 4c of heater 4.

Even though, in the embodiments shown so far, most temperature sensors were thermopiles consisting of a plurality of thermocouples in series, it must be noted that some or all of them may be replaced by single thermocouples (or vice versa) depending on desired signal voltages and available space.

It must be noted that in the embodiments described above, each thermocouple used in the various thermopiles or alone consists of two conductors consisting of a first and a second material, respectively. Advantageously, the same materials are used for all thermocouples in order to profit from a shared Seeback coefficient. Advantageously, one material is a polysilicon and the other a metal, such as aluminum, both being materials conventionally used in integrated circuit technology. In addition, and again in order to have thermocouples with uniform properties, all conductors of the thermocouples should be manufactured from a the same two layers deposited on the substrate, e.g. one being a polysilicon layer and the other a metal layer.

Further, it must be noted that, even though thermocouples are advantageously used as temperature sensors, other types of temperature sensors, such as resistive temperature sensors, can be used as well. For example, monitoring temperature sensor 12a, 12b can be replaced by a resistivity measurement of heater 4 because the resistivity of heater 4 depends on its temperature. In that case, heater control 17 can be used for generating the reference voltage.

In general, the reference voltage of the present invention must be generated by a reference voltage generator. Advantageously, the reference voltage is proportional to the temperature difference between heater 4 and substrate 1. In the embodiment of FIG. 3, the monitoring thermocouples 12a, 12b play the role of such a reference voltage generator, or any other circuitry generating a signal indicative of the temperature of heater 4 can be used. In the embodiment of FIG. 5, microcontroller 18 and digital-analog-converter 20 are used as reference voltage generator, or analog circuitry could play the same role. As mentioned above, heater control 17 can also be used as reference voltage generator.

With increasing flow velocity, the reference voltage can be decreased continuously (or quasi-continuously, i.e. in very small steps) or it can decreased in step-like manner, such as in a small number of larger steps.

While there are shown and described presently preferred embodiments of the invention, it is to be distinctly understood that the invention is not limited thereto but may be otherwise variously embodied and practised within the scope of the following claims.

The invention claimed is:

1. A device for measuring the flow of a fluid comprising:
a heater,
a first and second temperature sensor arranged on opposite sides of said heater for generating a sensing signal depending on a temperature difference upstream and downstream from said heater,
an analog-digital-converter for digitizing said sensing signal, wherein said analog-digital converter has a reference input and generates a digitized value of said sensing signal normalized by a signal at said reference input,
a reference voltage generator connected to said reference input, wherein said reference voltage generator is adapted to decrease said reference voltage for increasing flows of said fluid.

2. The device of claim 1 wherein said reference voltage generator is controlled by a temperature signal indicative of a temperature of said heater to decrease said reference voltage upon an increase of said flow.

3. The device of claim 2 further comprising a monitoring temperature sensor generating a signal indicative of a temperature of said heater.

4. The device of claim 3 wherein said monitoring temperature sensor is arranged at said heater.

5. The device in claim 3 wherein said monitoring temperature sensor comprises at least one thermocouple.

6. The device of any of the preceding claims wherein said reference voltage is proportional to a temperature signal indicative of a temperature of said heater.

7. The device of claim 6 wherein said reference voltage is proportional to a temperature difference between said heater and said fluid or between said heater and a substrate carrying said heater.

8. The device of claim 1 wherein said analog-digital-converter is a sigma-delta converter.

9. The device of claim 1 wherein said device is adapted to first measure an raw digitized value while feeding a fixed reference voltage to said analog-digital-converter, then to set said reference voltage to a value dependent on said raw digitized value, and then to measure a corrected digitized value for calculating said flow.

10. The device as in any of claims 1-5 or 8-9, wherein said first and second temperature sensors comprise thermocouples.

11. The device of claim 1 wherein said heater and said first and said second temperature sensors and said analog-digital-converter are integrated on a substrate.

12. The device of claim 11 wherein said substrate is a semiconductor device.

13. The device of claim 1 further comprising a heater control for operating said heater at a constant current or power dissipation.

14. The device of claim 6, wherein said first and second temperature sensors comprise thermocouples.

15. The device of claim 7, wherein said first and second temperature sensors comprise thermocouples.

* * * * *